United States Patent
Sugiura et al.

(10) Patent No.: US 7,340,159 B2
(45) Date of Patent: Mar. 4, 2008

(54) IMAGE TAKING DEVICE AND PERSONAL IDENTIFICATION SYSTEM

(75) Inventors: Takayuki Sugiura, Kato (JP); Shuji Kimura, Kato (JP); Atsushi Miki, Kato (JP); Satoshi Fukui, Kato (JP); Kiyoshi Chinzei, Kato (JP); Mieko Nakano, Kato (JP); Naoyuki Fujimoto, Kato (JP); Mitsuhiro Gotoh, Kato (JP); Toshio Endoh, Kawasaki (JP); Takahiro Aoki, Kawasaki (JP); Mitsuaki Fukuda, Kawasaki (JP); Masaki Watanabe, Kawasaki (JP); Shigeru Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/234,142

(22) Filed: Sep. 26, 2005

(65) Prior Publication Data
US 2006/0018652 A1   Jan. 26, 2006

Related U.S. Application Data

(63) Continuation of application No. PCT/JP03/03988, filed on Mar. 28, 2003.

(51) Int. Cl.
G03B 29/00 (2006.01)
G03B 15/03 (2006.01)
G03B 7/083 (2006.01)

(52) U.S. Cl. .......................... 396/14; 396/89; 396/182; 396/234; 396/246; 348/370

(58) Field of Classification Search ............. 396/14, 396/15, 18, 182, 89, 234, 236, 246; 340/5.24; 348/161, 370; 362/3
See application file for complete search history.

(56) References Cited

U.S. PATENT DOCUMENTS 5,734,426 A   3/1998   Dong (Continued)

FOREIGN PATENT DOCUMENTS

JP   3-165672   7/1991

(Continued)

OTHER PUBLICATIONS

Official Communication from the SIPO, with respect to the Chinese counterpart application 038228483 dated Jul. 7, 2006 cites US 5,734,426 (Reference: AA) and JP 11-203452 (Reference: AG) in Form PTO-1449 hereof.

(Continued)

*Primary Examiner*—W. B. Perkey
*Assistant Examiner*—Rishi S. Suthar
(74) *Attorney, Agent, or Firm*—Staas & Halsey LLP

(57) ABSTRACT

In order to perform personal identification by matching a first body image that is obtained in advance by an image taking process with a second body image that is obtained when the identification is performed, an image taking device (1) for obtaining the second body image includes a shooting condition storage portion (203) for storing a shooting condition for each person in connection with an ID given to the person, the shooting condition being used when a body image of the person is taken for obtaining the first body image, an interface (24) for entering the ID of a person to be an object of the identification, and a shooting control portion (201) for controlling to take the body image under the shooting condition corresponding to the entered ID for obtaining the second body image of the person to be an object of the identification.

4 Claims, 16 Drawing Sheets

U.S. PATENT DOCUMENTS 5,991,429 A * 11/1999 Coffin et al. ................ 382/118
6,275,659 B1 * 8/2001 Ishihara et al. ............. 396/233

FOREIGN PATENT DOCUMENTS

| JP | 9-81727 | 3/1997 |
| JP | 10-21378 | 2/1998 |
| JP | 11-203452 | 7/1999 |
| JP | 2000-306095 | 11/2000 |

OTHER PUBLICATIONS

Official Communication from the SIPO, with respect to the Chinese counterpart application 038228483 dated Jul. 7, 2006.

Japanese Patent Office Action, mailed Jun. 5, 2007 and issued in corresponding Japanese Patent Application No. 2004-570132.

* cited by examiner

| OUTPUT VALUE OF THE DISTANCE MEASURING SENSOR | DISTANCE (cm) | EXPOSURE TIME (ms) | GAIN |
|---|---|---|---|
|  | CONTROLLING IS IMPOSSIBLE | | |
| 235~214 | 2~3 | 80 | 60 |
| 213~180 | ~4 | 85 | 60 |
| 179~156 | ~5 | 85 | 60 |
| 155~136 | ~6 | 85 | 60 |
| 135~120 | ~7 | 88 | 60 |
| 119~108 | ~8 | 90 | 60 |
| 107~99 | ~9 | 95 | 60 |
| 98~93 | 9~ | 100 | 60 |

| NUMBER N OF PIXELS IN THE SATURATED HIGHLIGHT | DISTANCE D | | |
|---|---|---|---|
| | D<5cm | 5cm≦D<7cm | D≧7cm |
| 2~3 | G= -5 | -10 | -26 |
| 4~5 | -8 | -13 | -29 |
| 6~7 | -11 | -16 | -32 |
| 8~9 | -14 | -19 | -35 |
| 10~11 | -16 | -22 | -39 |
| 12~13 | -18 | -25 | -42 |
| 14~15 | -20 | -27 | -45 |
| 16~17 | -23 | -30 | -48 |
| 18~19 | -25 | -33 | -48 |
| 20~21 | -30 | -35 | -48 |
| 22~23 | -33 | -38 | -48 |
| 24~27 | -36 | -38 | -48 |
| 28~34 | -40 | -38 | -48 |
| 35~ | -40 | -38 | -48 |

FIG. 12

| USER ID | CHARACTERISTIC INFORMATION | SHOOTING CONDITION INFORMATION ||
|---|---|---|---|
| | | EXPOSURE TIME (ms) | DISTANCE (cm) |
| A001 | 71a(71) | 80 | 4 |
| A002 | 71b(71) | 72 | 6.5 |
| A003 | 71c(71) | 90 | 2.5 |
| ⋮ | ⋮ | ⋮ | ⋮ |

| SEX S | AGE Y | DISTANCE D | | |
|---|---|---|---|---|
| | | D<5cm | 5cm≦D<7cm | D≧7cm |
| MALE | 0~3 | G= g11 | g12 | g13 |
| MALE | 4~6 | g21 | g22 | g23 |
| MALE | 7~12 | g31 | g32 | g33 |
| | | | | |
| FEMALE | 0~3 | g41 | g42 | g43 |
| FEMALE | 4~6 | g51 | g52 | g53 |
| FEMALE | 7~12 | g61 | g62 | g63 |
| ⋮ | ⋮ | ⋮ | ⋮ | ⋮ |

_US 7,340,159 B2_

IMAGE TAKING DEVICE AND PERSONAL IDENTIFICATION SYSTEM

This application is a continuing application, filed under 35 U.S.C. §111(a), of International Application PCT/JP2003/003988, filed Mar. 28, 2003, incorporated by reference herein.

TECHNICAL FIELD

The present invention relates to an image taking device for taking an image having a characteristic of a person and a personal identification system that uses the image taking device.

BACKGROUND ART

Conventionally, there is proposed a technique for authenticating a person in accordance with a physical characteristic of a human body.

However, in the case of personal identification in which lighting and image taking are combined, there is a difference of characteristic among persons about a thickness or a color of skin. Therefore, there can be generated a part of the obtained image in which a lightness is too high (so-called saturated highlight). Then, it is difficult to distinguish a person appropriately.

In consideration of such a problem, an object of the present invention is to take an image in accordance with a characteristic of each person, so that personal identification can be performed more correctly.

DISCLOSURE OF THE INVENTION

An image taking device according to the present invention is a device for performing an image taking process for obtaining a second body image when personal identification is performed by matching the second body image with a first body image that is obtained in advance by an image taking process. The device includes a shooting condition storage portion for storing a shooting condition for each person in connection with an ID given to the person, the shooting condition being used when a body image of the person is taken for obtaining the first body image, an input portion for entering the ID of a person to be an object of the identification, and an image taking portion for taking an image of a person's body under the shooting condition corresponding to the entered ID for obtaining the second body image of the person to be an object of the identification.

In another aspect of the present invention, an image taking device includes an image taking portion for taking an image of a person's body, and an output portion for sending the first body image of a person obtained by a image taking process using the image taking portion and a shooting condition for the image taking process to a storage portion in connection with an ID given to the person.

In another aspect of the present invention, an image taking device for performing an image taking process of an object by receiving light reflected by the object so as to form an image on a light reception portion is provided. The device includes a determining portion for determining whether or not a saturated highlight part is larger than a predetermined area In the entire or a part zone of the image obtained by the image taking process, the saturated highlight part having a brightness that is larger than a predetermined value, and a shooting control portion for controlling to redo (i.e. retake or repeat) the image taking process by correcting exposure time to be shorter as an area of the saturated highlight part is larger if the determining portion determines that the saturated highlight part is larger than predetermined area.

In another aspect of the present invention, an image taking device includes a corrected exposure time calculating portion for calculating a corrected exposure time that is an exposure time corrected to be shorter as an area of the saturated highlight part is larger so that the area of the saturated highlight part becomes smaller than the predetermined area when it is determined by the determining portion that the area of the saturated highlight part is larger than the predetermined area, a corrected exposure time storage portion for storing the corrected exposure time calculated by the corrected exposure time calculating portion in connection with an ID for identifying the object, an input portion for entering the ID, a shooting control portion for controlling to redo the image taking process by the corrected exposure time corresponding to the entered ID, an output portion for outputting the image obtained by the redo of the image taking process as a result of the image taking process.

A personal identification system according to the present invention is a system for performing personal identification. The system includes an output portion for sending a first body image and a shooting condition for each person to a storage portion that stores the first body image that is obtained in advance by an image taking process of a body of the personal and the shooting condition for the image taking process in connection with an ID that is given to the person, an input portion for entering the ID of a person to be an object of the identification, an image taking portion for taking an image of the person's body under the shooting condition corresponding to the person's ID entered by the input portion for obtaining a second body image of a person to be an object of the identification when the identification is performed, and an authenticating portion for authenticating the person by matching the first body image corresponding to the ID of a person to be an object of the identification with the second body image of the person obtained by an image taking process using the image taking portion.

Preferably, the storage portion stores a hooting distance for an image taking process for obtaining the first body image for each person in connection with the person's ID, and the authenticating portion authenticates the person by matching a shooting distance according to the ID of a person to be an object of the identification stored in the storage portion with a shooting distance for an image taking process for obtaining the second body image.

BRIEF DESCRIPTION OF THE DRAWINGS

FIG. 8 shows an example of a distance exposure table.

FIG. 10 shows an example of an exposure correction table.

FIG. 12 shows an example of a characteristic information database.

FIG. 16 shows an example of an exposure correction table.

BEST MODE FOR CARRYING OUT THE INVENTION

The present invention will be described in more detail with reference to that attached drawings.

Figure 1:
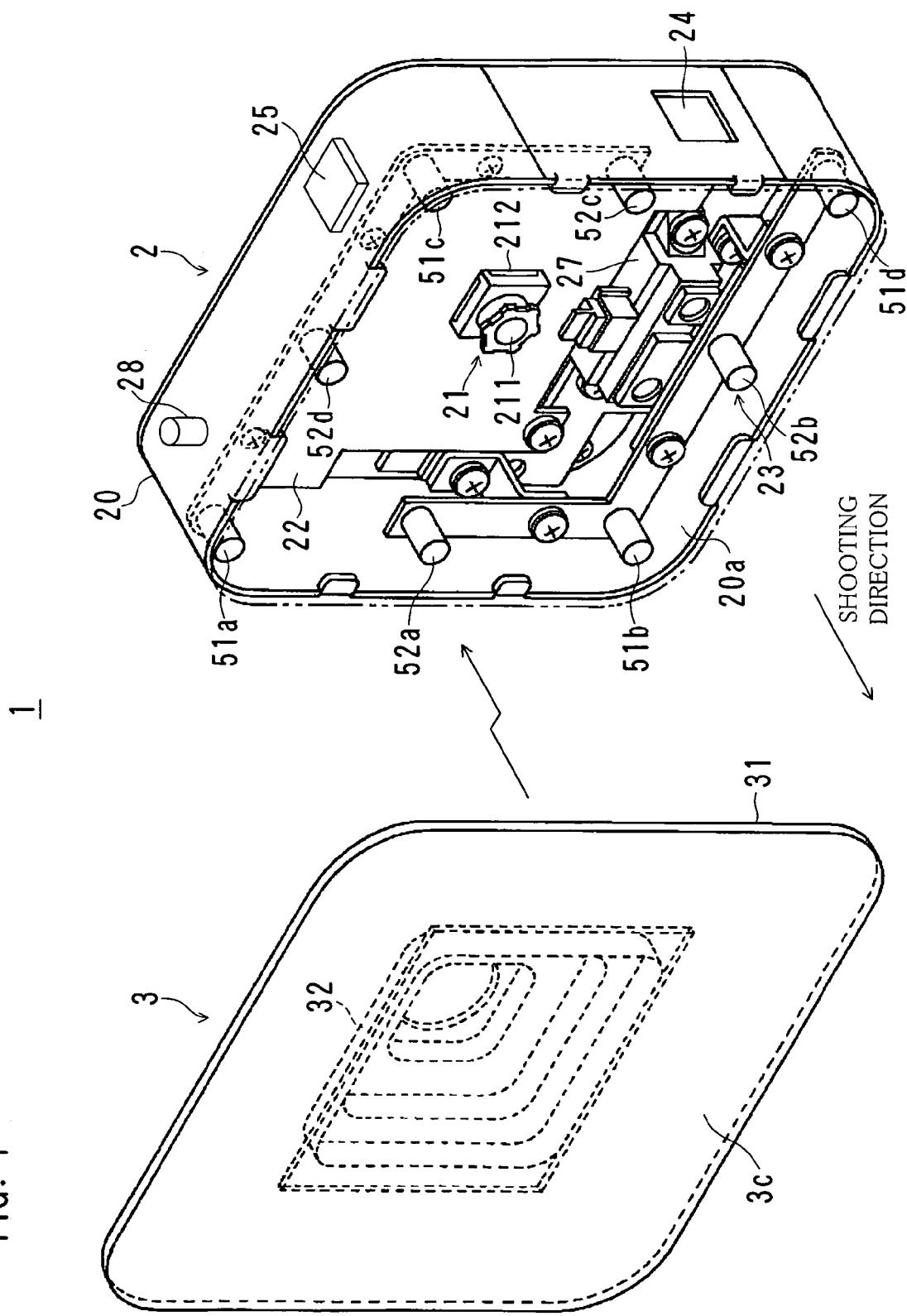
FIG. 1 is a perspective view showing an overall structure of an image taking device.
Figure 2:
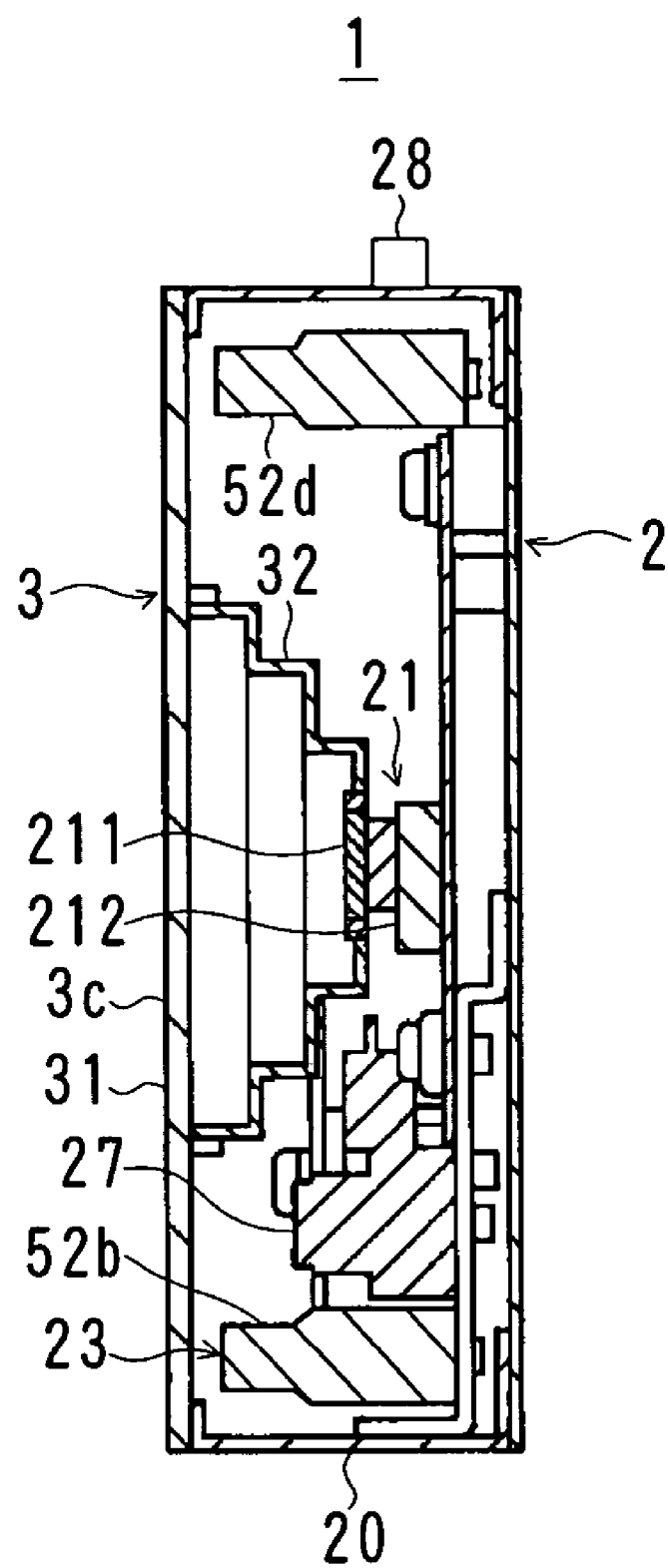
FIG. 2 is a cross section of the image taking device at the middle portion viewed from the side.
Figure 3:
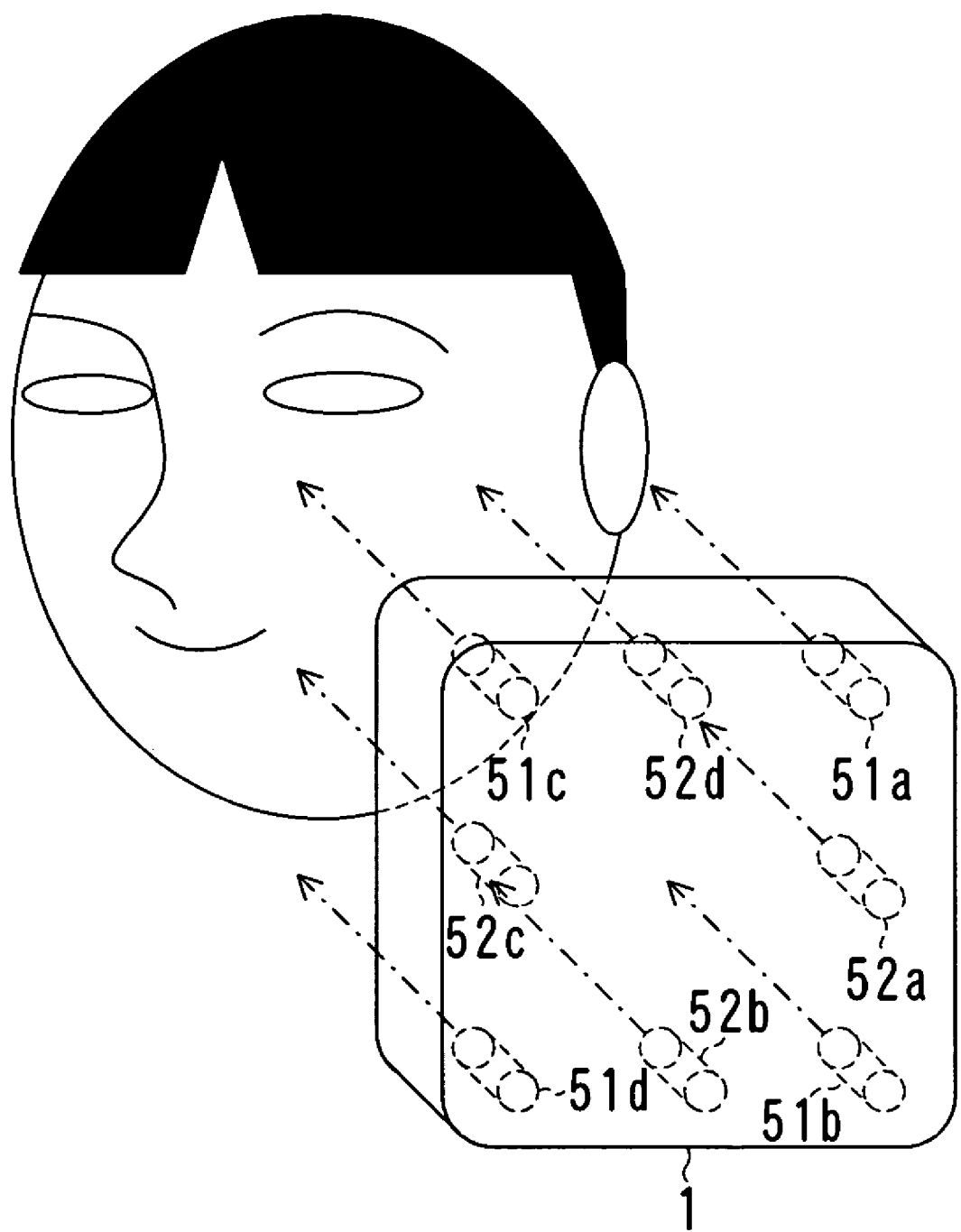
FIG. 3 shows an example of a situation in taking an image of a left cheek.
Figure 4:
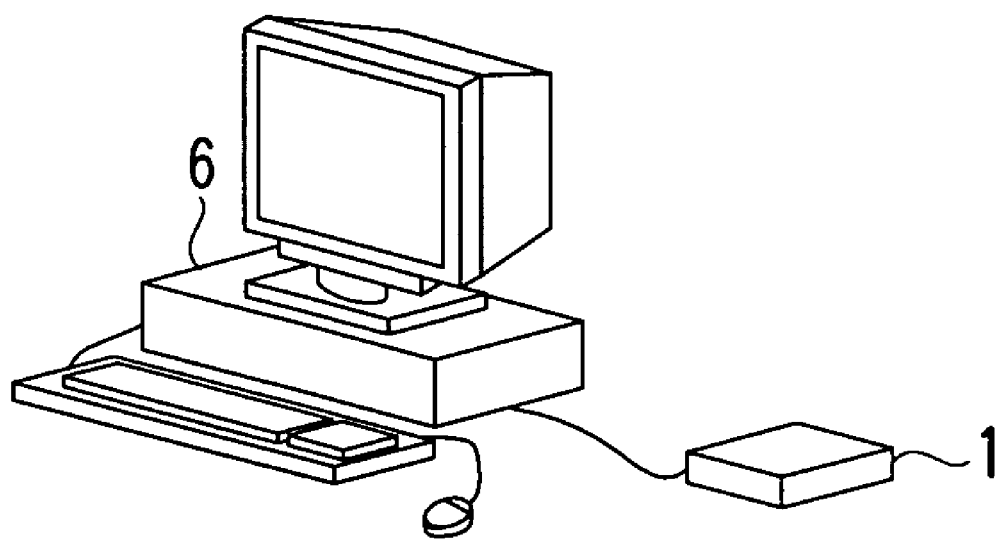
FIG. 4 shows an example of a user identification system.
Figure 5:
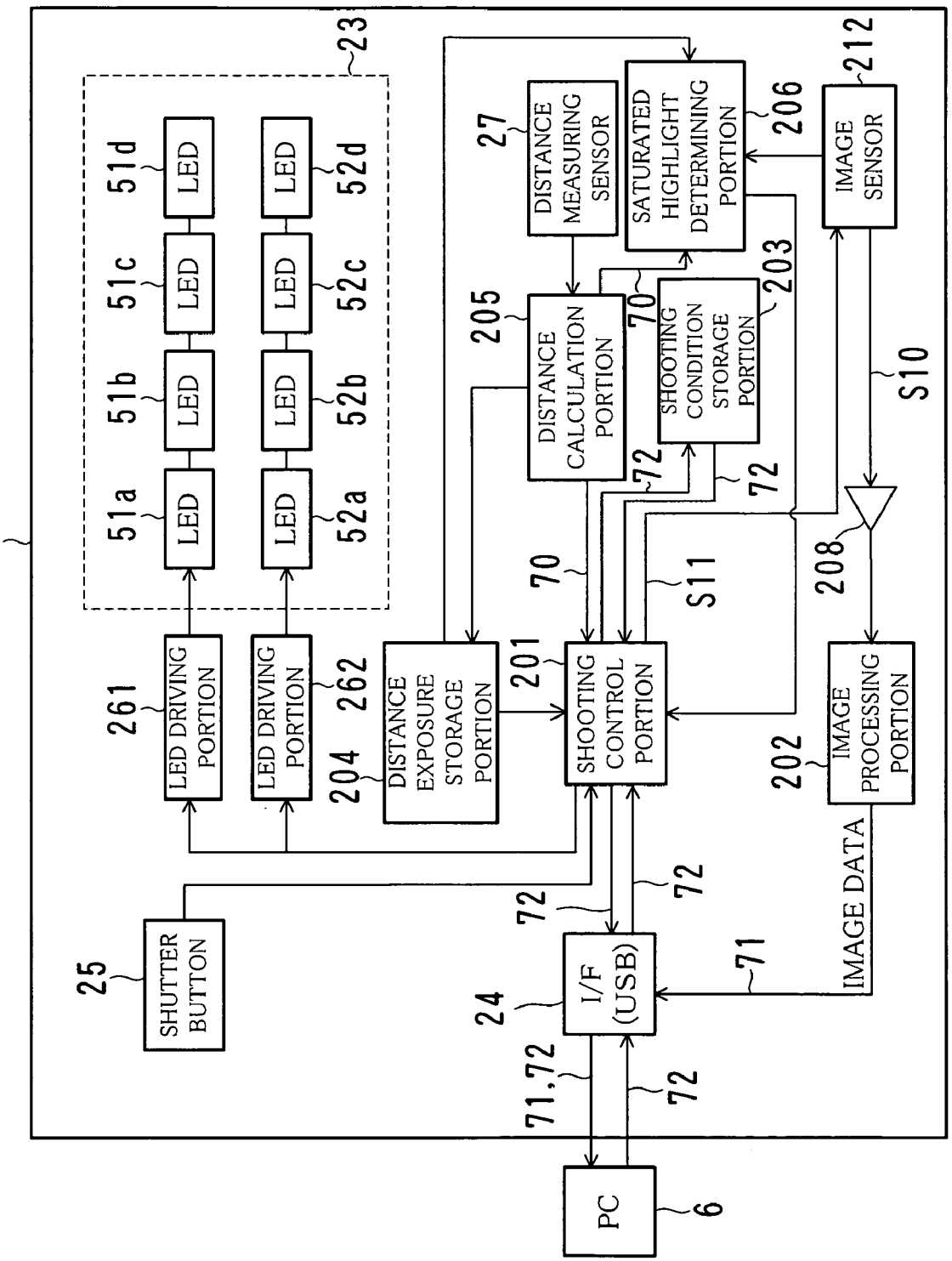
FIG. 5 is a block diagram showing an example of a functional structure of the image taking device.
Figure 6:
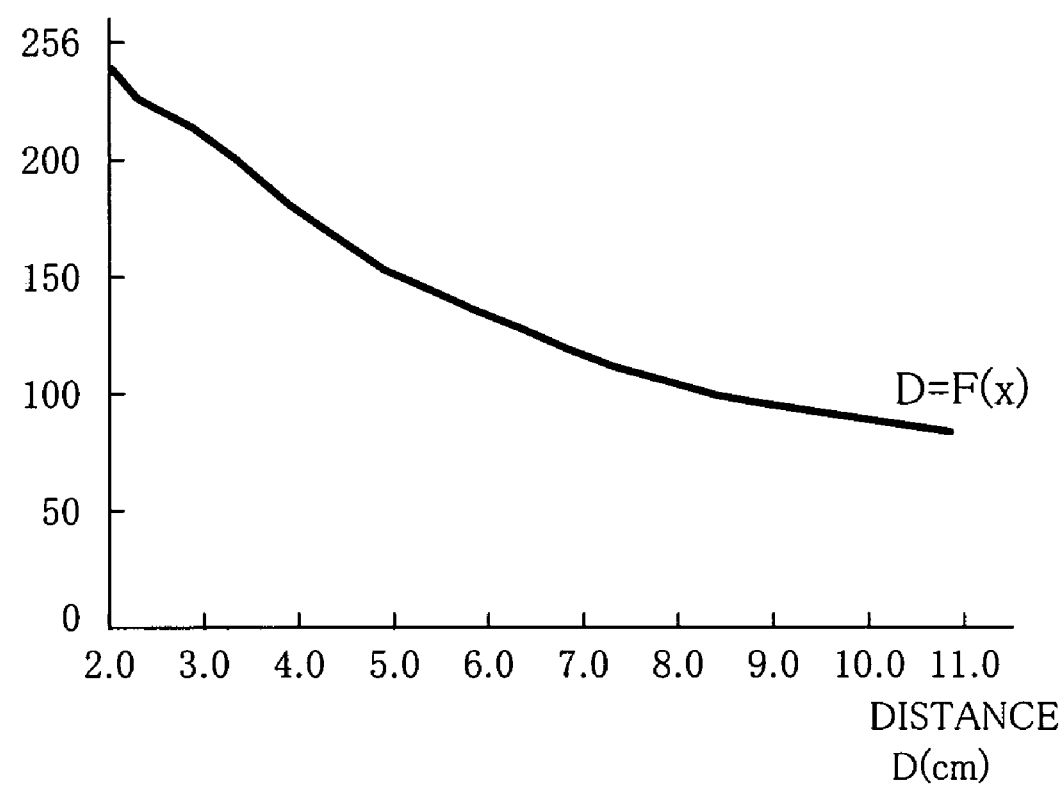
FIG. 6 shows a relationship between an output value of a distance measuring sensor and a real distance.

FIG. 1 is a perspective view showing an overall structure of an image taking device 1, FIG. 2 is a cross section of the image taking device 1 at the middle portion viewed from the side, FIG. 3 shows an example of a situation in taking an image of a left cheek, FIG. 4 shows an example of a user identification system 100, FIG. 5 is a block diagram showing an example of a functional structure of the image taking device, and FIG. 6 shows a relationship between an output value of a distance measuring sensor 27 and a real distance.

The image taking device 1 according to the present invention includes an image taking device main body 2 and a main body cover 3, as shown in FIGS. 1 and 2. This image taking device 1 is a device for taking an image of a pattern of a blood vessel in a part of a human body. Before taking an image, the main body cover 3 is attached to the front face 20a of the image taking device main body 2. Then, in order to take an image of a left cheek of a human face, the left cheek is set to oppose the front face of the image taking device 1 as shown in FIG. 3 so that the left cheek is parallel with the front face of the image taking device 1 (namely, the left cheek as a subject surface is perpendicular to an axis of shooting direction), and a distance between them is approximately 2-9 cm. Then, a shutter is released. Hereinafter, an example will be described in which an image of a blood vessel pattern of a human cheek is taken.

The image taking device main body 2 includes a casing (enclosure) 20, an image taking portion 21, a circuit board 22, a lighting portion 23, an interface 24, a shutter button 25, a distance measuring sensor (a distance sensor) 27, and a lamp 28. The image taking device main body 2 can be connected to a personal computer 6 via the interface 24 as shown in FIG. 4.

The casing 20 has a box-like shape with an opened front face 20a.

The image taking portion 21 includes a lens 211 and an image sensor 212. As the image sensor 212, a CCD type image sensor or a CMOS type image sensor can be used, for example.

The circuit board 22 is provide with a control circuit for controlling each portion of the image taking device 1 that will be described later and for D/A conversion, a ROM for storing a computer program (firmware) and data, and a CPU. The CPU performs operational processes in accordance with an instruction from the personal computer 6 or the shutter button 25, the computer program, the data or the like. By this structure, the image taking device 1 realizes functions including a shooting control portion 201, an image processing portion 202, a shooting condition storage portion 203, a distance exposure storage portion 204, a distance calculation portion 205, a saturated highlight determining portion 206, and LED driving portions 261 and 262 as shown in FIG. 5.

The lighting portion 23 includes an LED as a light source. The LEDs emitting infrared rays are used.

Current that is supplied to the LEDs is obtained from the personal computer 6 via the interface 24. If USB is used as the interface 24, communication with the personal computer 6 can be performed, and current can be supplied from the personal computer 6.

Referring FIGS. 1 and 2 again, the main body cover 3 includes a filter plate 31 made of a synthetic resin plate or a glass plate, and a lens cover 32 made of a synthetic resin plate. The main body cover 3 is attached to the front face 20a of the casing 20 with screws (not shown) or the like. The filter plate 31 is made of a material that cuts visible light and light having shorter wavelengths (i.e., light having wavelengths less than approximately 800 nm) and passes infrared rays, for example.

The distance measuring sensor 27, which is attached so as to be directed to the shooting direction, is used for measuring a distance between the distance measuring sensor 27 itself and an object of taking an image, i.e., a subject, and it is used for an identification process that will be described later. As the distance measuring sensor 27, an optical type or an ultrasonic type distance measuring sensor (distance sensor) is used.

As a position relationship between the distance measuring sensor 27 and each portion of the image taking device 1 is known in advance, a distance between each portion of the image taking device 1 and the subject can also be determined in accordance with a distance obtained by the distance measuring sensor 27. In this embodiment, a reference of a distance to the subject is defined as a front face 3c of the main body cover 3. Namely, a distance between the image taking device 1 and the subject is defined as a distance between the front face 3c of the main body cover 3 to the subject.

The distance measuring sensor 27 is set so that distances can be measured for three points including a vicinity of the base of a ear, a vicinity of the tip of the zygomatic bone (a vicinity of the portion under the outer corner of the eye) and the corner of the mouth for example, if the cheek that is a subject is located at the place a few centimeters away from the image taking device 1 (see FIG. 3).

The distance between the image taking device 1 and one point on the subject is determined finally by the following method specifically. The distance measuring sensor 27 outputs a measured value of 8 bits, i.e., 256 gradation levels as a result of measurement of distance to one point on the surface of the subject (subject surface).

A relationship between a measured value (output value) and a real distance varies a little depending on a type of the subject, and has a tendency that the real distance to the subject becomes shorter as the measured value increases. For example, when a surface of a human body is measured, a relationship between a measured value and a real distance becomes as shown in the function "D=F(x)" as shown in FIG. 6. This function is obtained by real measurement while changing a position of the cheek little by little. Then, a distance between the image taking device 1 and one point on the subject is determined by assigning the measured value into the function corresponding to a type of the subject.

The distance calculating portion 205 shown in FIG. 5 calculates distances between the image taking device 1 and three points on the cheek by the method described above, namely in accordance with the function shown in FIG. 6 and the measured values (output values) about the three points on the cheek. Then, an average value of these distances is regarded as a distance between the image taking device 1 and the subject. The distance value obtained in this way is given to the shooting control portion 201 and the saturated highlight determining portion 206 as distance information 70.

The shooting control portion 201 instructs LED driving portions 261 and 262 to start supplying current to the LEDs 51a-51d and 52a-52d at the moment when the shutter button 25 is pressed and the shutter is released. Then, it instructs to stop the supply of current in accordance with an exposure time. Thus, each of the LEDs emits light in synchronization with the shutter release and the shutter speed (exposure time). Note that it is possible that the instruction for releasing the shutter is performed by the personal computer 6 instead of the shutter button 25.

When the shutter is released and each of the LEDs emits light, the light is irradiated to the cheek that is a subject. However, visible light and the like are cut by the filter plate 31 (see FIGS. 1 and 2), so only infrared rays are irradiated to the subject. In general, a blood vessel of a human being or an animal has characteristic of absorbing infrared rays. Therefore, a part of the surface of the cheek where blood vessels exist under the skin does not reflect the infrared rays so much, while a part without blood vessels reflects the infrared rays well.

The reflected light from the subject passes through the filter plate 31, enters the casing 20, and is focused by the lens 211 on the image sensor 212. The image sensor 212 converts the light to an electric signal so as to produce an image data. The image processing portion 202 performs image processing on the image data so as to generate an image of a blood vessel pattern of the cheek. Note that it is possible to perform the image processing in the personal computer 6.

The shutter may be a mechanical shutter such as a lens shutter or a screen shutter, or an optical shutter such as a liquid crystal shutter. In addition, it is possible to start accumulation of charge by the image sensor 212 in synchronization with an instruction of taking an image and to finish the accumulation of charge or read the accumulated charge after the exposure time, for example. Namely, the exposure time in this structure means an accumulation time of charge. Alternatively, it is possible to combine the mechanical, the optical and the electrical shutters.

[Automatic Exposure Control Function]

Figure 7:
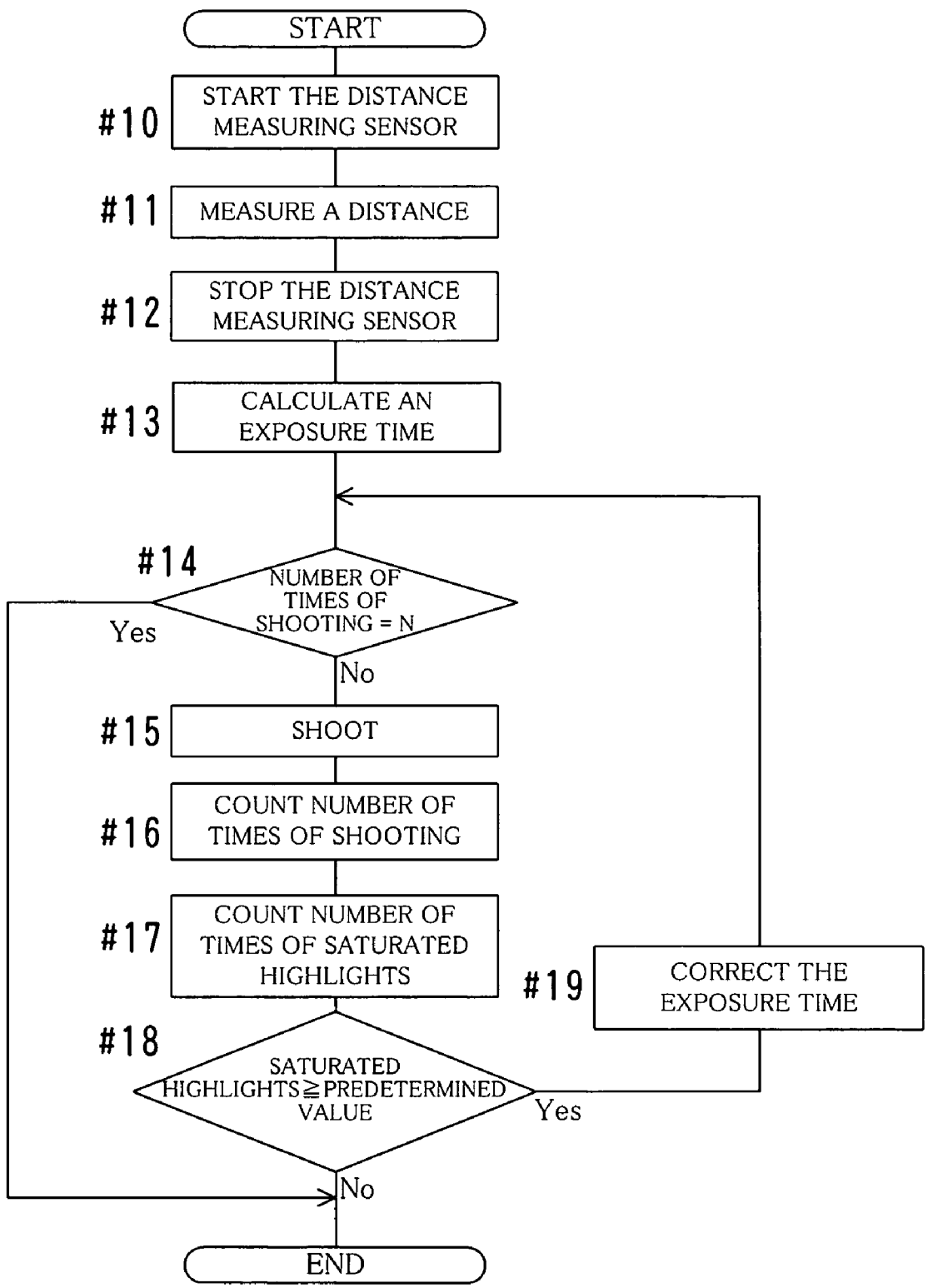
FIG. 7 is a flowchart showing an example of a flow of a process for taking an image using an automatic exposure control function.
Figure 9:
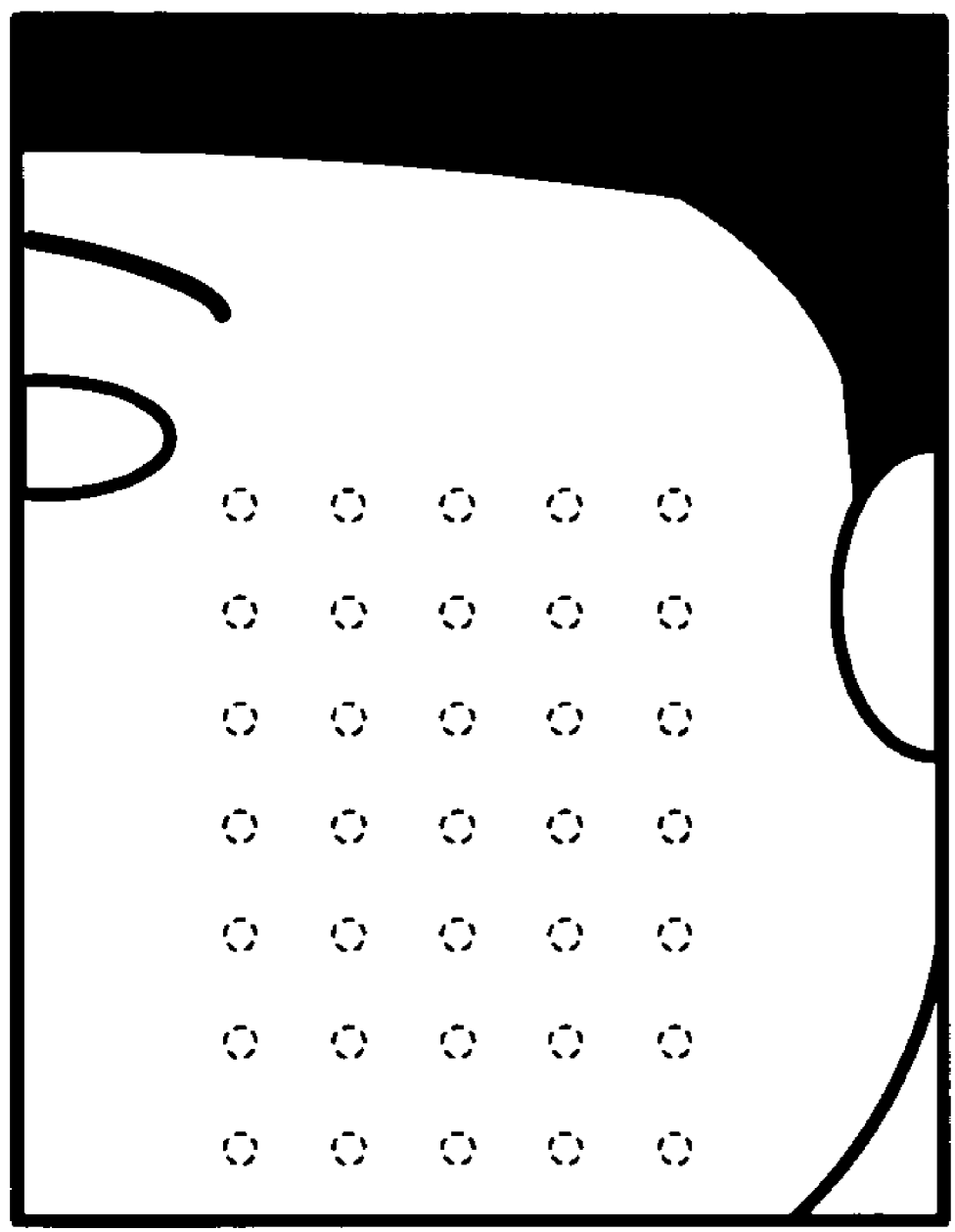
FIG. 9 shows an example of a cheek image.

FIG. 7 is a flowchart showing an example of a flow of a process for taking an image using an automatic exposure control function, FIG. 8 shows an example of a distance exposure table TL1, FIG. 9 shows an example of a cheek image FA1, FIG. 10 shows an example of an exposure correction table TL2.

The image taking device 1 is provided with a function for controlling exposure time automatically for each person to be a subject (hereinafter, referred to as a "user") in order to suppress generation of saturated highlight (hereinafter, this function is referred to as an "automatic exposure control function"). Next, contents and process order of this function will be described with reference to a flowchart shown in FIG. 7.

The distance exposure storage portion 204 shown in FIG. 5 stores the distance exposure table TL1 and the exposure correction table TL2 (see FIG. 10). The distance exposure table TL1 defines standard exposure time corresponding to a distance between the image taking device 1 and the subject as shown in FIG. 8. As understood from FIG. 8, the exposure time is set to a value larger as a distance between the image taking device 1 and the subject (cheek) is larger. For example, if the distance to the image taking device 1 is 2.5 cm, the exposure time is set to 80 milliseconds. If it is 8.5 cm, the exposure time is set to 95 milliseconds.

Note that a "gain" in the distance exposure table TL1 indicates an output gain of the output signal S10 that is output from the image sensor 212 to the image processing portion 202. In FIG. 5, the adjustment signal S11 for adjusting the output gain is transmitted from the shooting control portion 201 or the like in accordance with the distance exposure table TL1. In addition, it is possible to adjust the output gain manually. An amplifier 208 amplifies the output signal S10. It is possible to eliminate the amplifier 208. It is possible that a gain of the amplifier 208 is variable and the gain is adjusted by the adjustment signal S11 so as to adjust the output gain of the output signal S10. In this case, it is possible to structure the amplifier 208 integrally inside the image sensor 212. Note that if the output signal S10 is digital data, a data converter may be used instead of the amplifier 208. In this example, the output gain is set to the same value despite the distance.

The distance measuring sensor (distance sensor) 27 and the distance calculation portion 205 shown in FIG. 5 measure a distance between the image taking device 1 and the cheek of the user that is a subject before taking an image, and they obtain the distance information 70 (#10 and #11 in FIG. 7). After measurement, the distance measuring sensor 27 is stopped so as to prevent light emitted by the distance measuring sensor 27 from interfering light emitted by the LED (#12).

The shooting control portion 201 calculates the exposure time in accordance with the distance information 70 and the distance exposure table TL1 (#13). Then, an image of the cheek of the user is taken under the condition of the exposure time (#15). Thus, a cheek image FA1 shown in FIG. 9 is obtained. Note that a blood vessel pattern under skin in the cheek image FA1 is omitted, and instead an appearance of the left cheek is drawn for simplifying description as shown in FIG. 9. A real cheek image FA1 has a blood vessel pattern. This is the same concerning the cheek image FA2 that will be described with reference to FIG. 15.

The saturated highlight determining portion 206 determines how many saturated highlights are generated in the cheek image FA1 (#17, #18). This determination is performed as follows. First, brightness of pixels in a predetermined zone of the cheek image FA1 is determined. The predetermined zone means the entire or a part zone of a preset cheek image FA1. In the example shown in FIG. 9, the predetermined zone has 7×5 parts indicated by dotted circles. Each of the circles indicates one pixel that is away from others. Namely, the predetermined zone has the dotted 7×5 pixels in the example shown in FIG. 9.

It is checked whether or not brightness of each of the pixels (namely, pixels indicated by 7×5 circles) included in the predetermined zone is higher than a predetermined value. For example, if the brightness is expressed in 256 gradation steps of 0-255, the predetermined value is set to "255". It is possible to set a value of approximately "250" as the predetermined value corresponding to characteristics of the image sensor 212.

An area of a part having a value more than the predetermined value in the predetermined zone is determined. As the pixels have the same area, an area of the part can be determined by counting the number of pixels. The area determined in this way or the number of pixels indicates a grade of occurrence of the saturated highlight.

With reference to FIG. 7 again, if the number of pixels having a value more than the predetermined value is less than a predetermined number (for example, less than two) (No in #18), it is determined that the cheek image FA1 does not include a saturated highlight that requires correction of the exposure time. Therefore, the cheek image FA1 that is taken just now is delivered to the personal computer 6 or the like as a result of taking an image.

If the number of pixels having a value more than the predetermined value is the predetermined number or more (Yes in #18), it is determined the cheek image FA1 includes the saturated highlight that requires correction of the exposure time. In this case, correction for shorten the exposure time so as to suppress the saturated highlight is performed (#19), and the process for taking the cheek image of the user is performed again under the condition of the exposure time (#15).

The correction of the exposure time is performed in accordance with the number of pixels in the saturated highlight (an area of the saturated highlight), the distance information 70 and the exposure correction table TL2 as follows. The exposure correction table TL2 defines an adjustment value G that is added for correcting the exposure time and that corresponds to the distance D between the image taking device 1 and the subject when taking an image and the number N of pixels in the saturated highlight as shown in FIG. 10.

For example, if the distance D indicated in the distance information 70 is four, and the number N of pixels in the saturated highlight is three, the adjustment value G=−5 is obtained from the exposure correction table TL2. This adjustment value G is added to the exposure time of the image taking process that was performed just before. Namely, if the exposure time of the image taking process performed just before is 85 milliseconds, the exposure time is subtracted by five to be corrected to 80 milliseconds.

If the adjustment value G obtained in this way corresponds the inside of the rectangle of thick line in the exposure correction table TL2, there is a case where an appropriate image cannot be taken even after correcting the exposure time. In this case, it is possible to stop the image taking process as an error. Then, the distance between the image taking device 1 and the subject may be changed for taking the image again.

Then, with reference to FIG. 7 again, the determination of the saturated highlight is performed for the newly obtained cheek image FA1 (#17 and #18). If the number of pixels in the saturated highlight is smaller than the predetermined number (No in #18), the cheek image FA1 is delivered to the personal computer 6 as a result of the image taking process. If the number of pixels in the saturated highlight is the predetermined number or more (Yes in #18), the image taking process is repeated until the saturated highlight decreases (until it becomes less than two, here). However, the number of times of taking an image is counted (#16), and if the number of times exceeds the predetermined number (for example, three) (Yes in #15), the process of taking an image is stopped as it is disabled.

[User Identification Process]

Figure 11:
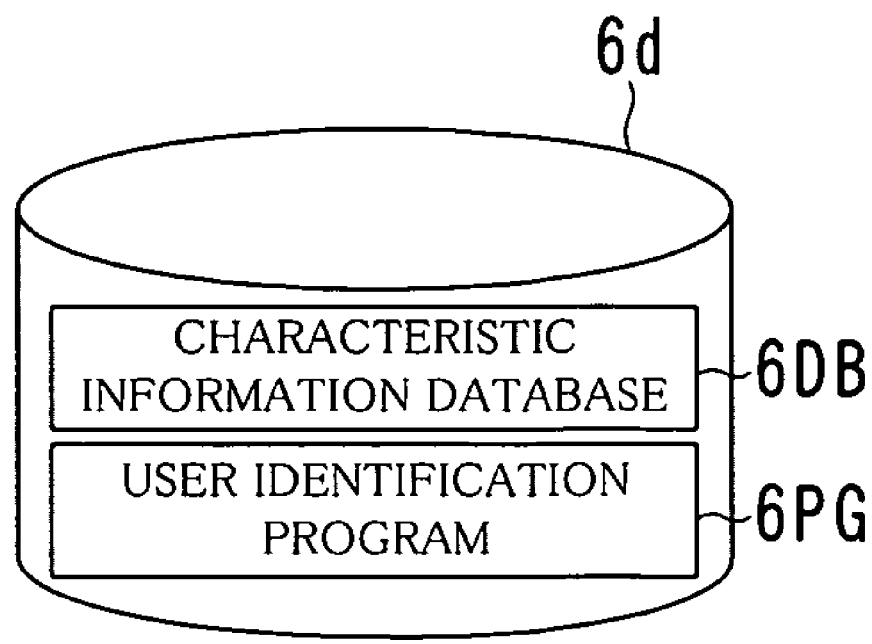
FIG. 11 shows an example of a program and data stored in a magnetic storage device.
Figure 13:
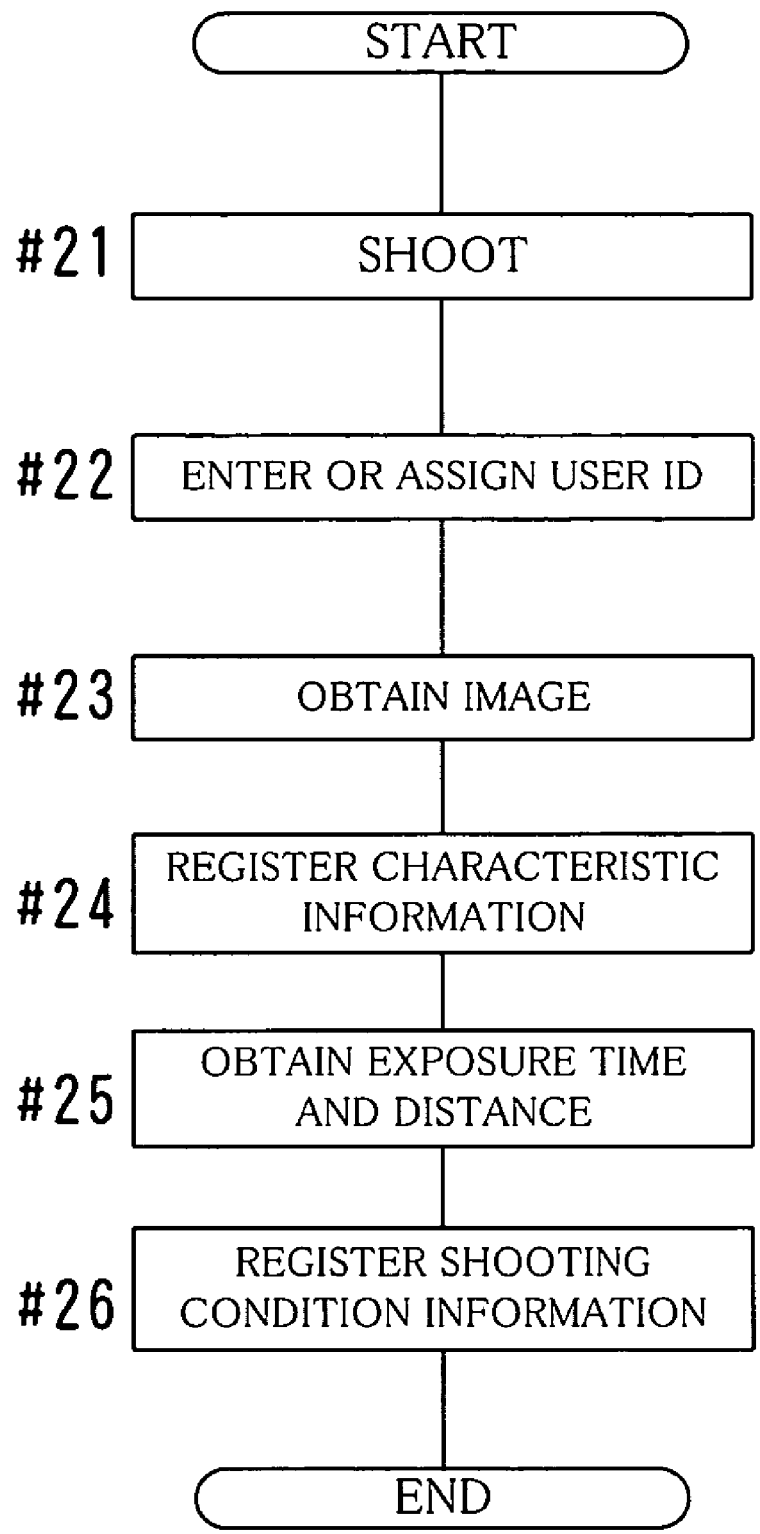
FIG. 13 shows an example of a flow of a process for registering the characteristic information and shooting condition information.
Figure 14:
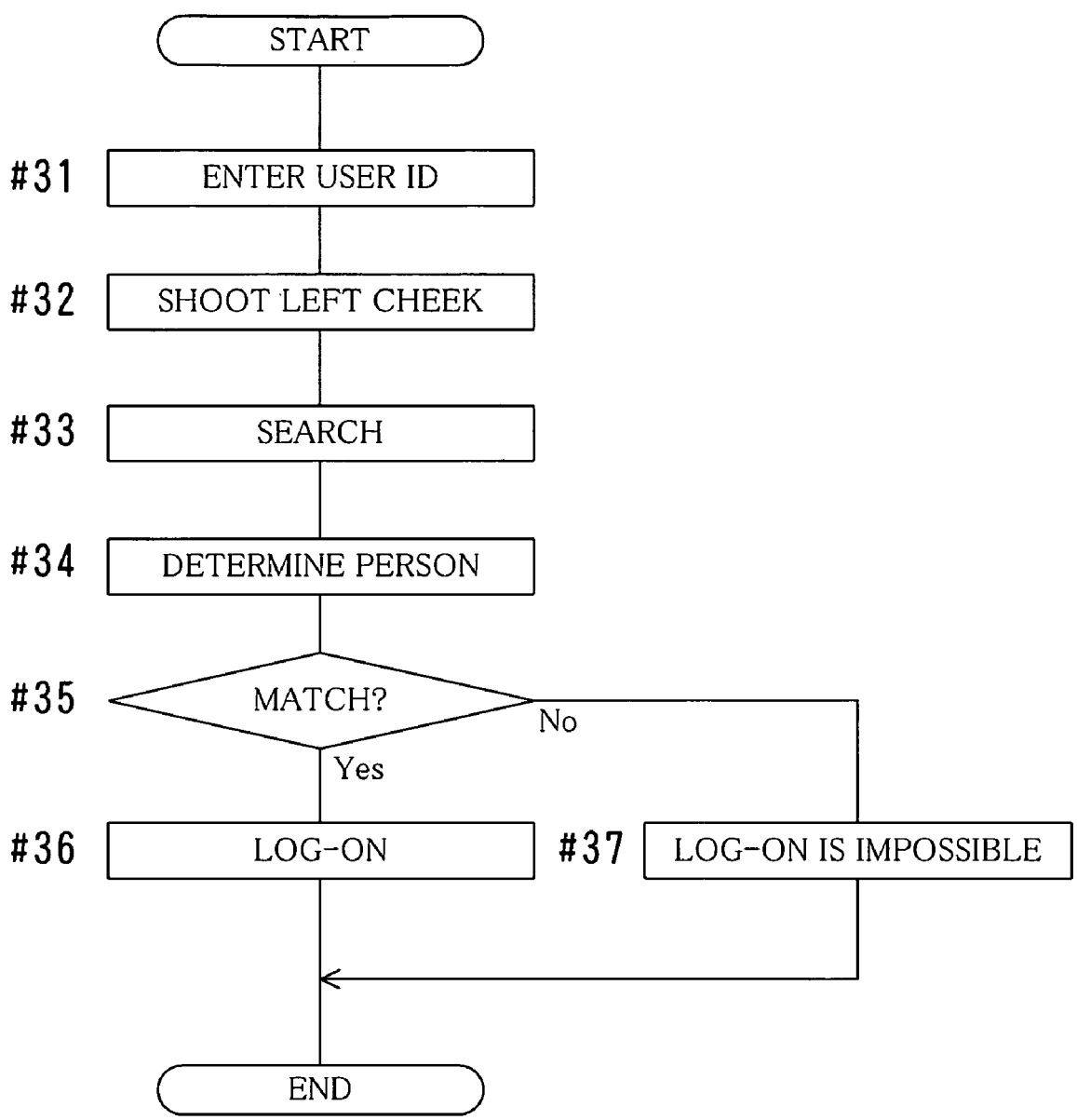
FIG. 14 is a flowchart showing an example of a flow of a process for identifying a user.
Figure 15:
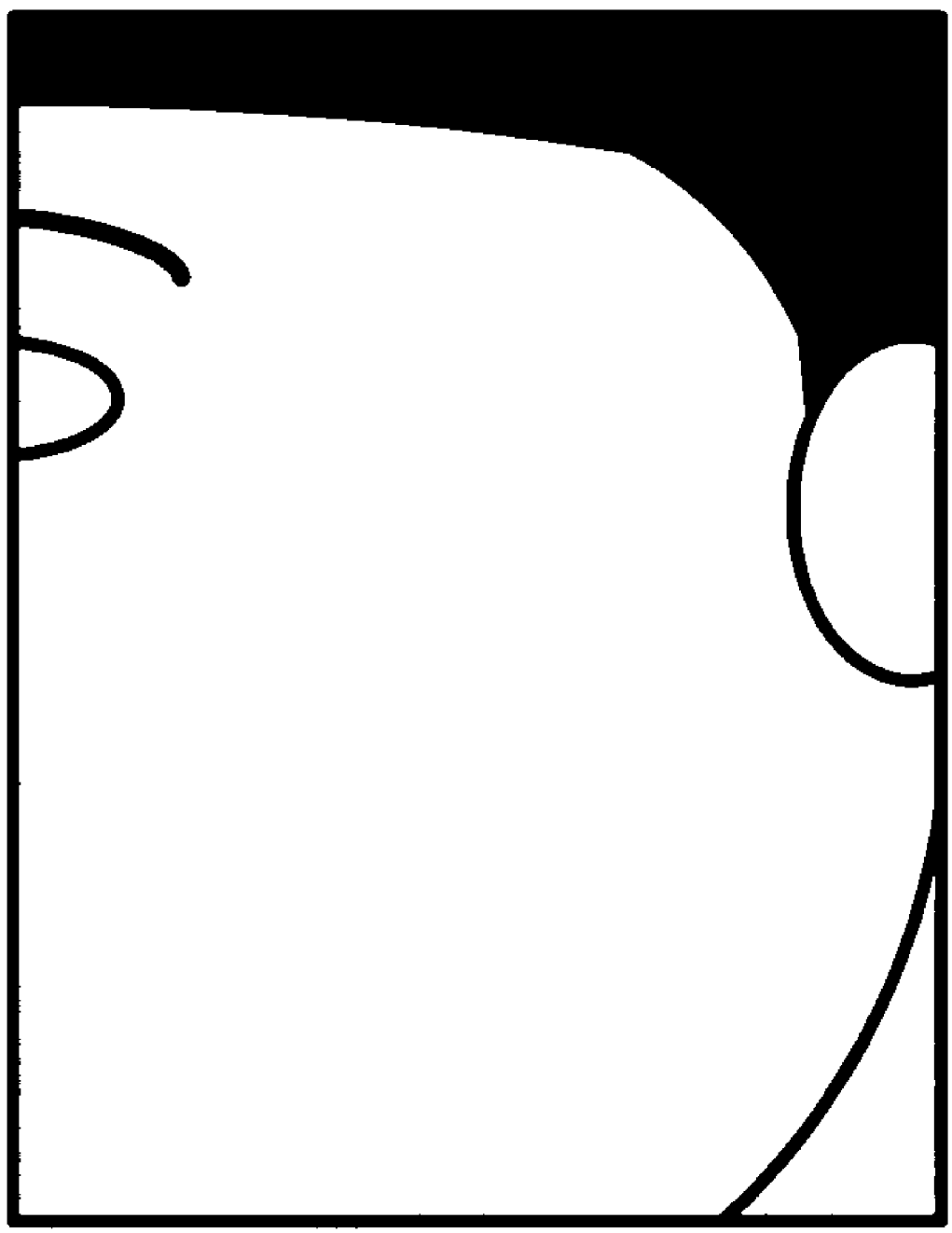
FIG. 15 shows an example of a cheek image.

FIG. 11 shows an example of a program and data stored in a magnetic storage device 6d, FIG. 12 shows an example of a characteristic information database 6DB, FIG. 13 shows an example of a flow of a process for registering the characteristic information 71 and shooting condition information 72, FIG. 14 is a flowchart showing an example of a flow of a process for identifying a user, FIG. 15 shows an example of a cheek image FA2.

The user identification system 100 for identifying a person (a user) can be constituted by the image taking device 1 and the personal computer 6. Hereinafter, the user identification process will be described in an exemplified case where the log-on process is performed in the personal computer 6 shown in FIG. 4.

The magnetic storage device 6d of the personal computer 6 stores the characteristic information database 6DB as shown in FIG. 11. This characteristic information database 6DB stores characteristic information 71 (71a, 71b, . . . ) for each user in connection with a user ID for identifying the user as shown in FIG. 12. The user who wants to use the personal computer 6 is required to register (store) the characteristic information 71 and the shooting condition information 72 in connection with his or her user ID in the characteristic information database 6DB in advance.

The characteristic information 71 is information about the user's characteristics about a body or habits. In this embodiment, information of a blood vessel pattern in the left cheek is used as the characteristic information 71. The shooting condition information 72 indicates a shooting condition that is suitable for taking an image of the blood vessel pattern in the left cheek of the user.

The registration of the characteristic information 71 and the shooting condition information 72 is performed in the procedure shown in FIG. 13. First, the user takes an image of a blood vessel pattern in his or her left cheek by the image taking device 1 (#21). The procedure for taking the image is as described above with reference to FIG. 7 and other drawings. Before or after taking the image, the user enters his or her user ID with a keyboard of the personal computer 6 (#22). If the user does not have a user ID, the user should be given the user ID from an administrator of the system in advance. Or the user should be given the user ID after taking the image.

If the image taking process is finished successfully, the personal computer 6 receives the cheek image FA1 obtained by the image taking process from the image taking device 1 (#23). Then, this image data of the cheek image FA1 is stored as the characteristic information 71 in connection with the entered or assigned user ID in the characteristic information database 6DB (#24). Alternatively, information indicating characteristics of the blood vessels such as thickness, length, quantity or arrangement of vessels, which is obtained by analyzing the cheek image FA1, may be stored as the characteristic information 71.

The shooting condition when obtaining the cheek image FA1, namely information indicating a exposure time that is corrected to be adapted to the user and a distance between the image taking device 1 and the left cheek is received from the image taking device 1 (#25). Then, the information is stored as the shooting condition information 72 in connection with the user ID in the characteristic information database 6DB (#26).

As shown in FIG. 11, a user identification program 6PG is installed in the magnetic storage device 6d. When this program is executed, a process for determining whether or not a user who is going to log on the personal computer 6 is a regular user is realized in the procedure as shown in a flowchart shown in FIG. 14.

When the personal computer 6 is turned on, a log-on screen is displayed on the personal computer 6. Here, the user enters his or her user ID (#31) and takes an image of his or her left cheek by the image taking device 1 so as to obtain the cheek image FA2 as shown in FIG. 15 (#32). The cheek image FA2 is transmitted to the personal computer 6.

Note that the process for obtaining the cheek image FA2 is performed by referring the characteristic information database 6DB shown in FIG. 12 and in accordance with the shooting condition information 72 corresponding to the entered user ID. Namely, the image taking process is performed by an exposure time that is optimal for the user corresponding to the entered user ID. Furthermore, when taking the image, a position of the user's left cheek is guided as follows so that a distance between the image taking device 1 and the user's left cheek becomes an optimal distance indicated in the shooting condition information 72.

Before taking an image, a distance between the image taking device 1 and the user's left cheek is measured regularly (for example, every one second) by the distance measuring sensor 27 (see FIGS. 1 and 2). If the difference between the measured distance and the distance indicated shooting condition information 72 is more than a predetermined value (e.g., approximately 0.1-0.3 cm), the lamp 28 is blinked. When a distance between the image taking device 1 and the user's left cheek approaches the optimal distance and is below the predetermined value, blinking of the lamp 28 is stopped so as to stay on. Furthermore, it is possible to determine a posture of the left cheek in accordance with distances between the image taking device 1 and three points on the left cheek, so as to guide the left cheek to be parallel with the front face of the image taking device 1.

It is possible to provide a speaker to the image taking device 1 instead of the lamp 28 and to produce a message sound such as "Please move closer 1 cm more" or "Please move away a little" so as to guide a position of the subject. It is possible to provide a liquid crystal display panel and to display a message, a figure, a picture, a photograph or an image for guiding. It is possible to use a speaker or a display device of the personal computer 6 for guiding.

With reference to FIG. 14 again, the personal computer 6 searches characteristic information 71 corresponding to the entered user ID from the characteristic information database 6DB (#33). Then, characteristics of the blood vessel pattern shown in the characteristic information 71 are matched with characteristics of the blood vessel pattern of the cheek image FA2, and it is determined whether or not the both characteristics match one another so as to determine whether the user is a regular user or not (#34).

If it is determined that the user is a regular user (Yes in #35), the user can log on the personal computer 6, and the personal computer 6 can be used (#36). If it is not determined that the user is a regular user (No in #35), the personal computer 6 displays a message indicating the user cannot log on and should operate again (#37).

Note that the personal identification process can be used not only for the log-on process described above but also for other processes including, for example, a payment process in an electronic payment system or a personal identification for recording arrival or departure time (on a time card).

According to this embodiment, an image can be taken in accordance with characteristics of each person, so that an image with little saturated highlight can be obtained. Thus, personal identification can be performed more correctly.

Note that it is possible to store the shooting condition information 72 when performing the image taking process for obtaining the cheek image FA1 (#21 in FIG. 13) in connection with the user ID in the shooting condition storage portion 203 of the image taking device 1 (see FIG. 5). Thus, even if the image taking device 1 is not connected to a personal computer 6, the shooting condition information 72 can be searched in accordance with a user ID that is entered with an operational button that is provided to the image taking device 1, so that the image taking process can be performed promptly under the shooting condition that is optimal for the user. Therefore, it is useful when an image of a blood vessel pattern is taken for a physical examination regularly. It is also easy to take an image by carrying the image taking device 1 to various places.

Although the exposure time is set longer as a distance to the subject is larger and the output gain of the image sensor 212 is constant regardless of the distance in this embodiment as shown in FIG. 8, it is possible to set the gain larger as the distance is longer and to set the exposure time to a constant value. Namely, it is possible to use the output gain as the shooting condition. It is also possible to use the both as the shooting condition.

Although image taking device 1 takes an image of a blood vessel pattern of a human cheek for discriminating a user in this embodiment, the identification can be performed by a blood vessel pattern of other parts of a body, of course. For example, it is possible to take an image of various parts including a forehead, a head, an abdomen, a back, a hip, a neck, a hand, a foot, an arm or a leg. In this case, the image taking device 1 may be structured by changing an arrangement of the LEDs, intensity of the LED, an adjustment condition of the automatic exposure (see FIGS. 8 and 10) and others in accordance with the part to be an object of the image taking process. It can be also used for taking an image of animals.

FIG. 16 shows an example of an exposure correction table TL3. Although the exposure time (see FIG. 12) for each user is determined by correcting standard exposure time in accordance with the area of the saturated highlight (the number of pixels in the saturated highlight) when taking an image of the user in this embodiment, it is possible to determine it in accordance with an age or a gender of the user.

In this case, information indicating an age and a gender of each user is stored in connection with the user ID in a database, for example. In general, the saturated highlight has a tendency of appearing more often in a female than in a male. Furthermore, the appearing tendency of the saturated highlight is distinctive to an age or a generation. Therefore, the exposure correction table TL3 as shown in FIG. 16 is prepared in the distance exposure storage portion 204 (see FIG. 5). Note that an adjustment value G (g11, g12, . . . , g63, . . . ) for adjusting (correcting) the exposure time is obtained by taking real images of many elders and youths as well as males and females, and by analyzing statistically the exposure time for each combination of a gender and a generation (or an age).

Then, the exposure time that is optimal for obtaining an image such as the cheek image FA1 or FA2 (see FIG. 9 or 15) may be determined by referring the exposure correction table TL3 and in accordance with the adjustment value G corresponding to an age and a gender of the user. Furthermore, the obtained exposure time is stored as the shooting condition information 72 in connection with the user ID of the user in the characteristic information database 6DB (see FIG. 12) or in the shooting condition storage portion 203.

Note that it is possible to structure that the exposure time can be corrected by combining elements including a profession of the user and a sport that the user plays regularly adding to an age and a gender.

Although the exposure time is changed in accordance with the user's saturated highlight in this embodiment, it is possible to change other shooting conditions. For example, it is possible to change intensity of the light source (LED) or ambient brightness. In this case, it is preferable to prepare a table for determining optimal intensity of LED, which corresponds to the distance exposure table TL1 or the exposure correction table TL2 (see FIG. 8 or 10).

Though a distance between the image taking device 1 and the subject (user's cheek) is used for guiding a position of the subject in this embodiment, it is possible to use it together with the cheek image as characteristic information 71 for performing user identification process.

Namely, it is possible to regard the way how the user sets the distance between the image taking device 1 and his or her left cheek as user' habit (characteristic) when performing the image taking process for obtaining the image FA1 of the cheek, and to store the distance in connection with the user ID. Then, it is determined that the user is a regular user in the process of Steps #34 and #35 shown in FIG. 14 if a difference between the distance when the image taking process for obtaining the cheek image FA2 (#32 in FIG. 14) is performed and the distance indicated in the characteristic information 71 is a predetermined value (for example, a few millimeters) or less. Otherwise, it is determined that the user is not a regular user.

Although a matching process of cheek images FA1 and FA2 is performed by the personal computer 6 for the identification process of a user (a person) in this embodiment, it is possible to perform the matching process in the image taking device 1. Namely, it is possible to provide the entire or a part of the functions of the personal computer 6 to the image taking device 1.

It is possible to perform the image taking process for obtaining the cheek images FA1 and FA2 in the plural image taking devices 1. However, it is preferable to use the image taking devices 1 having the same structure in this case.

Furthermore, the structure the entire or a part of the image taking device 1 or the personal computer 6, the object of taking an image, the arrangement and intensity of the LEDs, the arrangement of the optical system including the lens, the contents of processes, the process order, the contents of the database or the table or others can be changed if necessary in accordance with the spirit of the present invention.

INDUSTRIAL APPLICABILITY

As described above, the present invention is useful for performing a personal identification more precisely by taking an image corresponding to characteristics of the person.

The invention claimed is:

1. An image taking device for performing an image taking process for obtaining a second body image when personal identification is performed by matching the second body image with a first body image that is obtained in advance by an image taking process, the device comprising:
   a shooting condition storage portion that stores a shooting condition for each person in association with an ID given to the person, the shooting condition being used when a body image of the person is taken for obtaining the first body image;
   an input portion that enters the ID of a person to be an object of the identification;
   an image taking portion that takes an image of a person's body under the shooting condition corresponding to the entered ID for obtaining the second body image of the person to be an object of the identification;
   a determining portion that determines whether or not an area of a saturated highlight part is larger than a predetermined area in the entire image or a part zone of the image obtained by the image taking portion, the saturated highlight part having a brightness that is larger than a predetermined value;
   a corrected exposure time calculating portion that calculates a corrected exposure time that is an exposure time corrected to be shorter as an area of the saturated highlight part is larger so that the area of the saturated highlight part becomes smaller than the predetermined area when it is determined by the determining portion that the area of the saturated highlight part is larger than the predetermined area;
   a corrected exposure time storage portion that stores the corrected exposure time calculated by the corrected exposure time calculating portion in association with the ID of the person to be an object of the image taking process performed by the image taking portion; and
   a reshooting control portion that controls the image taking portion to retake the image taking process by the corrected exposure time corresponding to the ID entered by the input portion.

2. A personal identification system for performing personal identification, the system comprising:
   an output portion that sends a first body image and a shooting condition for each person to a storage portion that stores the first body image that is obtained in advance by an image taking process of a body of the person and the shooting condition for the image taking process in association with an ID that is given to the person;
   an input portion that enters the ID of a person to be an object of the identification;
   an image taking portion that takes an image of the person's body under the shooting condition corresponding to the person's ID entered by the input portion for obtaining a second body image of a person to be an object of the identification when the identification is performed;
   an authenticating portion that authenticates a person by matching the first body image corresponding to the ID of the person to be an object of the identification with the second body image of the person obtained by an image taking process using the image taking portion;
   a determining portion that determines whether or not an area of a saturated highlight part is larger than a predetermined area in the entire image or a part zone of the image obtained by the image taking portion, the saturated highlight part having a brightness that is larger than a predetermined value;
   a corrected exposure time calculating portion that calculates a corrected exposure time that is an exposure time corrected to be shorter as an area of the saturated highlight part is larger so that the area of the saturated highlight part becomes smaller than the predetermined area when it is determined by the determining portion that the area of the saturated highlight part is larger than the predetermined area;
   a corrected exposure time storage portion that stores the corrected exposure time calculated by the corrected exposure time calculating portion in association with the ID of the person to be an object of the image taking process performed by the image taking portion; and
   a reshooting control portion that controls the image taking portion to retake the image taking process by the corrected exposure time corresponding to the ID entered by the input portion.
   wherein if the image taking portion takes an image of the body of the person to be an object of the identification again, the authentication portion authenticates the person by using the second body image that is obtained by redoing the image taking process.

3. A personal identification system for performing personal identification, the system comprising:
- an output portion that sends a first body image and a shooting condition for each person to a storage portion that stores the first body image that is obtained in advance by an image taking process of a body of the person and the shooting condition including a shooting distance for the image taking process in association with an ID that is given to the person;
- an input portion that enters the ID of a person to be an object of the identification;
- an image taking portion that takes an image of the person's body under the shooting condition corresponding to the person's ID entered by the input portion for obtaining a second body image of a person to be an object of the identification when the identification is performed; and
- an authenticating portion that authenticates a person by matching the first body image corresponding to the ID of the person to be an object of the identification with the second body image of the person obtained by an image taking process using the image taking portion and by matching a shooting distance corresponding to the ID of the person to be an object of the identification stored in the storage portion with a shooting distance for the image taking process for obtaining the second body image.

4. A method for performing an identification process of a person, the method comprising:
- storing a first body image that is obtained by taking an image of the person's body in advance and a shooting condition for taking the image in a storage portion for each person in association with an ID that is given to the person;
- entering the ID of a person to be an object of the identification process;
- taking an image of a person's body under the shooting condition corresponding to the entered person's ID for obtaining a second body image of a person to be an object of the identification when the identification process is performed;
- authenticating the person by matching the first body image corresponding to the ID of the person to be an object of the identification with the second body image of the person obtained in the image taking step;
- determining whether or not an area of a saturated highlight part is larger than a predetermined area in the entire or a part zone of the obtained image, the saturated highlight part having a brightness that is larger than a predetermined value;
- calculating a corrected exposure time that is an exposure time corrected to be shorter as an area of the saturated highlight part is larger so that the area of the saturated highlight part becomes smaller than the predetermined area when it is determined that the area of the saturated highlight part is larger than the predetermined area;
- causing a corrected exposure time storage portion to store the corrected exposure time thus calculated in association with the ID of the person to be an object of an image taking process performed by an image taking portion; and
- repeating the image taking process using the corrected exposure time corresponding to the ID entered by an input portion.

* * * * *

UNITED STATES PATENT AND TRADEMARK OFFICE
CERTIFICATE OF CORRECTION

PATENT NO. : 7,340,159 B2  Page 1 of 1
APPLICATION NO. : 11/234142
DATED : March 4, 2008
INVENTOR(S) : Takayuki Sugiura et al.

It is certified that error appears in the above-identified patent and that said Letters Patent is hereby corrected as shown below:

On the Title Page, Item (75) (Inventors), Line 4, after the fifth inventor's name, change "Kato" to --Daito--.

Column 12, Line 62, change "portion." to --portion,--.

Signed and Sealed this

Twenty-ninth Day of July, 2008

JON W. DUDAS
*Director of the United States Patent and Trademark Office*